United States Patent
Herzog

(10) Patent No.: US 8,260,759 B2
(45) Date of Patent: Sep. 4, 2012

(54) METHOD FOR MAINTAINING A PRODUCTION INSTALLATION

(75) Inventor: Michael Herzog, Rothenfluh (CH)

(73) Assignee: Endress + Hauser Process Solutions AG, Reinach (CH)

( * ) Notice: Subject to any disclaimer, the term of this patent is extended or adjusted under 35 U.S.C. 154(b) by 1443 days.

(21) Appl. No.: 10/500,149

(22) PCT Filed: Dec. 21, 2002

(86) PCT No.: PCT/EP02/14699
§ 371 (c)(1),
(2), (4) Date: Apr. 28, 2005

(87) PCT Pub. No.: WO03/058361
PCT Pub. Date: Jul. 17, 2003

(65) Prior Publication Data
US 2005/0177533 A1    Aug. 11, 2005

(30) Foreign Application Priority Data
Jan. 11, 2002   (DE) .................................. 102 01 021

(51) Int. Cl.
G06F 17/30    (2006.01)

(52) U.S. Cl. ..................... 707/705; 707/736; 707/758

(58) Field of Classification Search ................ 707/802, 707/803, 705, 736, 758
See application file for complete search history.

(56) References Cited

U.S. PATENT DOCUMENTS

| | | | |
|---|---|---|---|
| 2002/0032626 A1* | 3/2002 | DeWolf et al. | 705/35 |
| 2002/0080022 A1* | 6/2002 | Edwards | 340/457 |
| 2003/0055826 A1* | 3/2003 | Graham | 707/10 |
| 2005/0262202 A1* | 11/2005 | Motoyama et al. | 709/206 |

FOREIGN PATENT DOCUMENTS

| | | |
|---|---|---|
| DE | 19917102 | 12/2000 |
| DE | 10030305 | 11/2001 |
| EP | 0 822 473 A2 | 2/1998 |
| EP | 0 965 897 A1 | 12/1999 |
| WO | WO 97/50021 | 12/1997 |

OTHER PUBLICATIONS

Kunz, J C. et ali: "Support for Integrated Value-Based Maintenance Planning", IEEE Expert, IEEE Inc., New York, NY, US, Bd. 11, Nr. 4, Aug. 1, 1996.

Koechlin J-B et al: "A conceptual data scheme for integrated maintenance: A map to design maintainable AMS" Compeuro '93. 'Computers in Design, Manufacturing, and Production', Proceedings. Pris-Evry, France May 24-27, 1993, Los Alamitos, CA, USA, IEEE Comput. Soc, US, May 24, 1993.

* cited by examiner

*Primary Examiner* — Mahesh Dwivedi
(74) *Attorney, Agent, or Firm* — Bacon & Thomas, PLLC

(57) ABSTRACT

In a method for maintaining a production installation having a plurality of field devices F1, F2, F3 connected partly, or completely, over a data bus D with a control system L, the field devices F1, F2, F3 are registered in a manufacturer data base HG-DB with a manufacturer-specific identification and manufacturer-specific information relevant for maintenance, and in a customer database IB-DB with a customer-specific identification and customer-specific information. An electronic database query on the basis of maintenance criteria is performed in both of the databases HG-DB and IB-DB. In this way, both manufacturer information and customer information can be considered in the maintenance process.

15 Claims, 1 Drawing Sheet

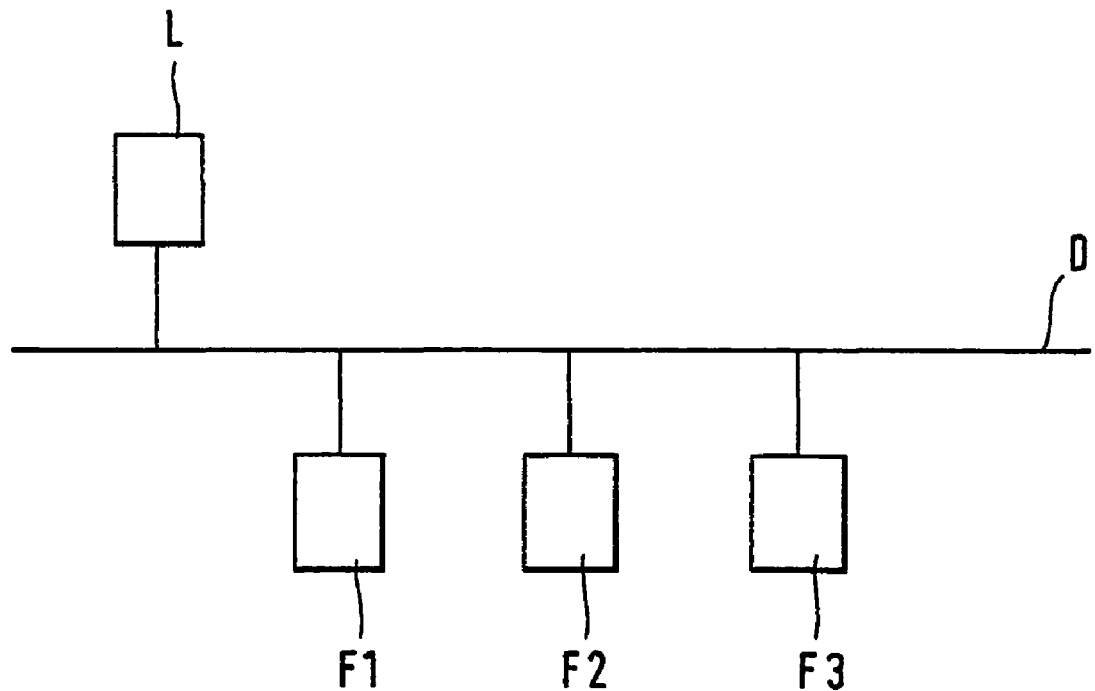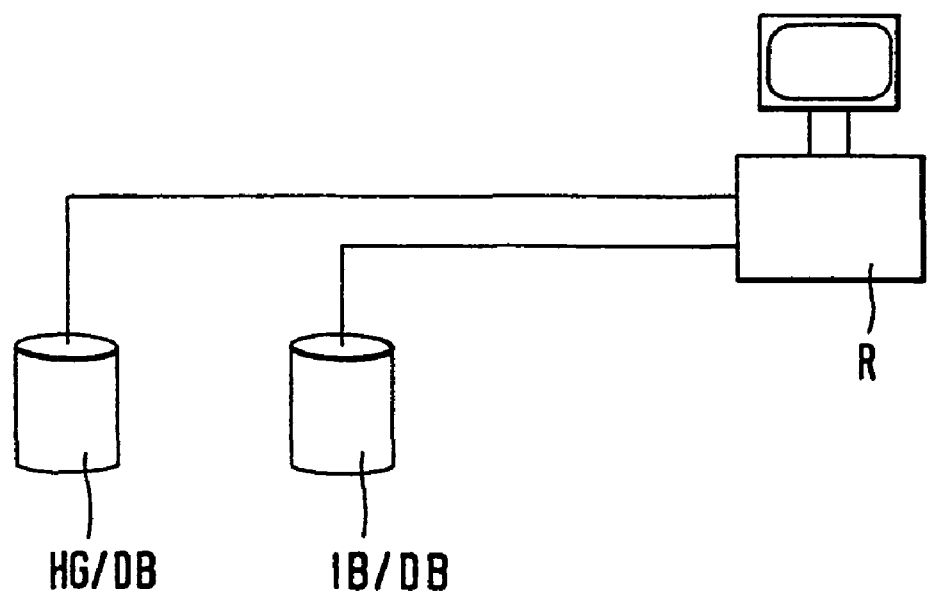

METHOD FOR MAINTAINING A PRODUCTION INSTALLATION

FIELD OF THE INVENTION

The invention relates to a method for maintaining a production installation having a plurality of field devices connected partly or entirely, over a data bus with a control system.

BACKGROUND OF THE INVENTION

In the technology of automation and process control, field devices are often used for determining a process variable in a process flow. Field devices for determining flow rate, fill level, differential pressure, temperature, etc. are generally known. They serve for registering the corresponding process variables: mass or volume flow rate, fill level, pressure, temperature, etc. The field devices produce signals, which act as measures for the registered process variables. As a rule, the field devices are, in part, or in total, connected with a control room or control system. The measurement signals are forwarded to the control room or control system. Normally, the entire process control is done at the control room or control system, where the various measurement signals of the different field devices are evaluated and, on the basis of the evaluation, control signals are produced for other field devices (actuators), e.g. valves, which then control the course of the process.

Signal transfer between the field device and the control room, or control system, occurs e.g. over current loops or a data bus, using known standards (Profibus, Foundation Fieldbus, CAN-Bus). The field devices are part of a production installation, whose management is very complex. Information concerning the production installation, or the components, or the field devices, begins to accumulate starting with the first day of planning. This information concerns essentially design, layout, procurement, installing, startup, operation and maintenance, i.e. the whole life cycle.

Maintenance is an essential cost factor of a production installation. For maintenance, various pieces of information are needed, which partly are in the purview of the user and partly in that of the manufacturer. Thus, only the user knows which of its applications are critical and what the loss of a field device would mean for production. For field devices being used in critical applications, greater attention to maintenance is always justified. In turn, only the manufacturer knows when production will end for which field devices in the foreseeable future. If the user alone drafts a maintenance plan, such is going to be incomplete, since essential information held by the manufacturer is not available.

If the manufacturer produces a maintenance plan for a production installation, it will, as a rule, lack the necessary information about the field devices in use, and, even if it has this information, it will still probably not know how critical the individual field devices are for the uninterrupted flow of production.

SUMMARY OF THE INVENTION

An object of the invention is, therefore, a method for maintaining of a production installation not having the above-described disadvantages, while being, at the same time, capable of execution especially simply and cost-effectively.

An essential idea of the invention is to register the field devices at a production installation electronically in a manufacturer database with a manufacturer-specific identification and manufacturer-specific information and in a customer database with a customer-specific identification and customer-specific information and to query both databases on the basis of maintenance criteria. In this case, all necessary information is available via database query for an optimal maintenance.

According to a further development of the invention, the manufacturer-specific identification is accomplished via a serial number of the field device.

According to a further development of the invention, the customer-specific identification is accomplished via a tag number of the field device.

The maintenance criteria include, besides corrective maintenance, also replacement and preventive maintenance.

According to a further development of the invention, a maintenance plan is produced on the basis of the database query.

According to a further development of the invention, the maintenance plan is stored in a maintenance database and every single point of the maintenance plan is confirmed or modified by the customer, before the storage. In this way, a higher, customer-specific suitability of the maintenance plan is achieved.

Since a user, as a rule, does not use only field devices of one manufacturer in its production installation, the manufacturer database includes also field devices of other manufacturers (foreign devices).

The manufacturer database can be completed e.g. by portions from Internet databases.

For the user, the costs of the maintenance plan are of essential interest. Therefore, the time requirements for the maintenance of individual field devices are stored in the manufacturer database, and, on the basis of this information, the prospective costs of the maintenance jobs accruing on the basis of the maintenance plan are calculated.

In order to assure a transparency of costs, a further development of the invention provides that the expense of already finished maintenance jobs is documented in the customer database, so that a projected-versus-actual cost comparison can be output for the maintenance plan.

Since the manufacturer database contains replacement part information, an optimum replacement part and consumable materials inventory can be determined for the chosen maintenance strategy.

The customer, in this way, can avoid unnecessary inventory levels of replacement parts and consumable materials.

In order to register, as quickly as possible, changes in inventory for the field devices of a production installation, it is provided that the operator of a production installation, i.e. the customer of the field device manufacturer, can itself supplement and modify the customer database via Internet access. Of course, appropriate security measures (authentication, password, etc.) are provided for this.

BRIEF DESCRIPTION OF THE DRAWING

The invention will now be described in greater detail on the basis of an example of an embodiment presented in the drawing, the figure of which shows as follows:

FIG. 1 is a production installation having a plurality of field devices, a manufacturer database and a customer database.

DESCRIPTION OF THE PREFERRED EMBODIMENTS

The production installation shown in FIG. 1 includes a control system L, which is connected with a plurality of field devices F1, F2 and F3 over a data bus D. The field devices F1 to F3 can be e.g. units measuring pressure, temperature or flow rate. The control system L communicates over the data bus with the field devices, e.g. with F1. In this way, data can be transferred between the field device F1 and the control system L. The data communications over the field bus occurs according to appropriate international standards, such as e.g. Profibus, Foundation Fieldbus or CAN-Bus.

In a manufacturer database HG/DB, the field devices F1 to F3 are electronically registered with a manufacturer-specific code and manufacturer-specific data. The data include at least information necessary for maintenance. Such information arises during design, layout, procurement, installing, startup, operation and maintenance. The manufacturer database includes, as a rule, not only the field devices F1, F2, F2 installed with the customer, but also other field devices, perhaps all field devices of the product line of the field device manufacturer.

In a further database, the customer database IB/DB, all field devices F1, F2, F3 are stored with a customer-specific code and customer-specific information. Both databases HG/DB and IB/DB are connected with a computer unit R, with the help of which database queries are possible.

The method of the invention will now be described in greater detail.

The method for maintaining a production installation having a plurality of field devices connected over a data bus with a control system, includes the following method steps.

Electronic registering of the field devices F1, F2 and F3 of a production installation in the manufacturer database HG/DB with a manufacturer-specific identification and manufacturer-specific information. This information includes at least information relevant for maintenance.

Electronic registering of the field devices F1, F2, F3 in the customer database IB/DB with a customer-specific identification and customer-specific information.

When all field devices of a production installation are connected over a data bus with a control system, a list of the field devices F1, F2, F3 can be generated via a data bus poll. Also in the customer database IB/DB are the specific requirements concerning the availability of the individual field devices.

In a third method step, an electronic database query is performed in the two databases HG/DB and IB/DB on the basis of maintenance criteria.

The maintenance criteria include corrective maintenance, replacement (migration) or preventive maintenance. The result of the database query is a maintenance plan. The maintenance plan specifies e.g. which field devices will need maintenance or replacement when.

The maintenance plan is stored in a maintenance database. Before the storage of the maintenance plan, the customer can confirm or change every separate point of the maintenance plan. In this way, the maintenance plan can be adapted to customer-specific requirements.

As a rule, a production installation will contain not only field devices of one particular manufacturer, but, instead, also foreign devices. For an optimal maintenance plan, it is, therefore, necessary to integrate also foreign devices into the manufacturer database HG/DB.

For this integration, e.g. Internet databases can be used.

In order to be able to estimate the probable costs which will arise for a given plan of maintenance, time consumption for maintenance of the individual field devices F1, F2, F3 is stored in the manufacturer database HG/DB.

For presenting a cost comparison for the maintenance plan, provision is also made for documenting in the customer database already experienced maintenance costs.

Furthermore, it is advantageous that the manufacturer database HG/DB contain replacement part information and that the database query establishes the optimal replacement part and consumable materials inventory for the chosen maintenance strategy.

In order that the customer database always reflect the current situation, provision is made that the operator of the production installation can itself supplement and modify the customer database IB/DB via Internet access. A maintenance plan matched to the modified inventory can automatically be reported to the operator e.g. via Internet, for value.

In an advantageous further development of the invention, the maintenance plan is the control file for an asset management system.

A further advantage resides in the fact that the replacement devices must be compatible with the originally used field devices. If a particular field device operates according to the Profibus protocol V2, then it can be replaced very simply by an equal field bus, which also works according to the protocol V2. This must be considered in the case of migration.

DTMs can also be stored in the manufacturer database HG-DB. DTMs are "device drivers" for field devices. Further information on DTMs can be obtained from the FDT/DTM interface specification, Profibus Guideline—Order No. 2.162 of November 2000, available from the Profibus User Organization e.V., Karlsruhe, Germany (www.profibus.com), the content of which is incorporated here by reference.

The invention claimed is:

1. A method for maintaining a production installation in the technology of automation and process control, having a plurality of field devices, comprising the steps of:
    partly, or completely, connecting said field devices over a data bus with a control system, whereby each field device determines or controls a process variable;
    electronically registering the field devices in a manufacturer database with a manufacturer-specific identification and manufacturer-specific information relevant for the maintaining of the production installation, whereby the manufacturer-specific information is only accessible to the manufacturer and whereby the manufacturer-specific information contains information about spare-parts or information when the production of each of the field devices will end;
    electronically registering the field devices in a customer database with a customer-specific identification and customer-specific information, whereby the customer-specific information is only accessible to the customer; and
    electronically querying the manufacturing database and the customer database on the basis of maintenance criteria, whereby the query determines the optimal stock of the spare parts or consumable materials inventory for the chosen maintenance strategy; wherein: the database querying yields a maintenance plan; and wherein: the maintenance plan is stored in a maintenance database and every separate point of the maintenance plan is confirmed or modified by the customer before the storing.

2. The method as claimed in claim 1, wherein:
    the manufacturer-specific identification is the serial number of the field device.

3. The method as claimed in claim 1, wherein:
    the customer-specific identification is the tag number of the field device.

4. The method as claimed in claim 1, wherein:
    the maintenance criteria include corrective maintenance, replacement or preventive maintenance.

5. The method as claimed in claim 1, wherein:
the manufacturer database also includes foreign devices of other manufacturers.

6. The method as claimed in claim 5, wherein:
the manufacturer database, or portions thereof, come from Internet databases.

7. The method as claimed in claim 1, wherein:
the time required for the maintenance of the field devices is stored in said manufacturer database and from this information, combined with the maintenance plan, projected costs of maintenance work are calculated.

8. The method as claimed in claim 1, wherein:
already-experienced, actual expenses of the maintenance work for the field devices are stored in said customer database and a projected versus actual cost comparison is produced for the maintenance plan.

9. The method as claimed in claim 1, wherein:
the customer database is supplemented and modified by the operator itself of the production installation, via Internet access.

10. The method as claimed in claim 9, wherein:
the operator receives automatically and via Internet a maintenance plan adapted to a changed inventory of field devices or changed requirements for the maintenance strategy.

11. The method as claimed in claim 1, wherein:
device type managers (DTMs) are stored in said manufacturer database (HG-DB) and are included in the maintenance plan in execution specifications intended for the maintenance personnel.

12. The method as claimed in claim 11, wherein:
electronic aids used for the maintenance are automatically adjusted by the maintenance plan.

13. The method as claimed in claim 1, wherein:
the maintenance plan represents the control file for asset management systems.

14. The method as claimed in claim 13, wherein:
control files for various asset management systems are produced by controlling the device type managers.

15. The method as claimed in claim 1, wherein:
a plurality of manufacturers support manufacturer databases in the Internet and, for each device in an installation, the appropriate link to the corresponding Internet address of the manufacturer database is contained in the device type manager of the particular device.

* * * * *